United States Patent [19]

Dalton, Jr. et al.

[11] 4,379,778
[45] Apr. 12, 1983

[54] HYDROGEN PEROXIDE SYNTHESIS

[75] Inventors: Augustine I. Dalton, Jr.; Ronald W. Skinner, both of Allentown, Pa.

[73] Assignee: Air Products and Chemicals, Inc., Allentown, Pa.

[21] Appl. No.: 195,829

[22] Filed: Oct. 10, 1980

[51] Int. Cl.³ ............................................. C01B 15/02
[52] U.S. Cl. ..................................... 423/584; 252/447
[58] Field of Search ......................................... 423/584

[56] References Cited

U.S. PATENT DOCUMENTS

| | | | |
|---|---|---|---|
| 2,285,277 | 6/1942 | Henke et al. | 252/447 |
| 2,520,038 | 8/1950 | Hultquist et al. | 252/447 |
| 2,749,359 | 6/1956 | Calkins et al. | 252/413 |
| 2,857,337 | 10/1958 | Hamilton et al. | 252/472 |
| 3,138,560 | 6/1964 | Keith et al. | 252/447 |
| 3,336,112 | 8/1967 | Hooper | 423/584 |
| 3,361,533 | 2/1968 | Hooper | 423/584 |
| 3,736,265 | 5/1973 | Suggitt | 252/445 |
| 3,736,266 | 5/1973 | Schrage | 252/447 |
| 3,864,281 | 2/1975 | Ohorodnik et al. | 252/447 |
| 4,007,256 | 2/1977 | Kim et al. | 423/584 |
| 4,009,252 | 2/1977 | Izumi et al. | 423/584 |
| 4,035,260 | 7/1977 | Schmitt, Jr. et al. | 252/447 |
| 4,093,559 | 6/1978 | Fernholz et al. | 252/443 |
| 4,279,883 | 7/1981 | Izumi et al. | 423/584 |

Primary Examiner—O. R. Vertiz
Assistant Examiner—Wayne A. Langel
Attorney, Agent, or Firm—James C. Simmons; E. Eugene Innis

[57] ABSTRACT

This invention relates to improvements in palladium-carbon catalysts for the production of hydrogen peroxide from a mixture of hydrogen and oxygen in the presence of an aqueous liquid capable of inhibiting the decomposition of hydrogen peroxide. The improvement comprises pretreating the catalyst with an aldehyde or ketone, and, preferably, also pretreating the catalyst with a dilute solution of hydrochloric acid. Improved catalysts are obtained by reducing a soluble palladium compound deposited on a high surface area non-graphitic carbon base, in the form of a dried powder, with hydrogen at 27°–200° C.

15 Claims, 2 Drawing Figures

HYDROGEN PEROXIDE SYNTHESIS

BACKGROUND OF THE INVENTION

1. Field of the Invention

This invention relates to an improvement in the manufacture of hydrogen peroxide from hydrogen and oxygen.

2. Prior Art

It has been proposed by Hooper, in U.S. Pat. No. 3,361,533, that the synthesis of hydrogen peroxide from its elements, hydrogen and oxygen, can be carried out in an aqueous liquid medium capable of inhibiting the decomposition of hydrogen peroxide in the presence of a solid catalyst. The liquid medium contemplated contains water, an acid and a non-acidic oxygen-containing organic compound. The solid catalyst can be an element of Group I or Group VIII of the Periodic Table, supported on a carrier such as alumina, silica, titanium dioxide, graphite or silicon carbide. A palladium catalyst is made by deposition of palladium (II) chloride or another palladium compound on a support and reduction by hydrogen at 50°–400° C. However, the teaching of Hooper is that alumina, silica or alumina-silica supports are preferred for catalysts giving high yields of hydrogen peroxide.

It has further been proposed by Hooper, in U.S. Pat. No. 3,336,112, that preparation of hydrogen peroxide from its elements with a solid catalyst in the liquid phase in the presence of water can be done in the presence of a sequestrative stabilizer for hydrogen peroxide, more particularly, a condensed phosphoric acid having a degree of polymerization up to about 14. Preferably, the catalyst is supported on $Al_2O_3$ or $SiO_2$ or a combination.

A variety of procedures have been proposed for the preparation of palladium catalysts on activated carbon supports.

Henke et al, in U.S. Pat. No. 2,285,277, disclose preparing a hydrogenation catalyst of a noble metal, e.g., palladium, by impregnation with a noble metal compound and reduction of the resulting slurry with alkaline formaldehyde, hydrazine or hydrogen, apparently at about or above 50° C.

U.S. Pat. No. 2,520,038, by Hultquist, discloses preparation of palladium on charcoal hydrogenation catalyst at a temperature substantially below that of the freezing point of water. Hydrogen is used as a reducing agent.

In U.S. Pat. No. 2,749,359, by Calkins et al, is disclosed preparation of palladium on charcoal catalysts suitable for hydrogenation. The catalyst is prepared by depositing the palladium on the charcoal, washing the coated catalyst with formic acid, washing with water, drying and reducing with hydrogen.

Hamilton et al, in U.S. Pat. No. 2,857,337, obtain palladium on charcoal or activated carbon catalysts for hydrogenation by reduction of a palladium salt with hydrogen and activation with various named metals. Formaldehyde is indicated as being an alternative for hydrogen in reducing the palladium salt.

U.S. Pat. No. 3,138,560, by Keith et al, discloses the production of palladium on carbon catalysts. Reduction is achieved either by organic chemical means, e.g., the use of aldehydes or formic acid, or by hydrogen. The use of hydrogen peroxide and hydrochloric acid in the preparation of selected catalysts is disclosed, but the reference does not contemplate treating a previously-prepared catalyst with HCl prior to use.

U.S. Pat. No. 3,736,265 by Suggitt, discloses catalysts of Group VIII metals on carbon. These are heated to from 700° F. to 1100° F. (371° C. to 593° C.) for two to eight hours in the presence of hydrogen. In the case of palladium catalysts, loss of activity is said to be prevented by heat treating for 1–24 hours at temperatures from 500° to 1200° F. The catalysts can be regenerated using a stream of hydrogen under the same conditions of time and temperature utilized for initial stabilization.

Schrage, in U.S. Pat. No. 3,736,266, also discloses a palladium on carbon hydrogenation catalyst. Hydrogen and formaldehyde are cited as conventional reducing agents.

U.S. Pat. No. 3,864,281, by Ohorodnik et al, discloses a palladium catalyst utilized for dehalogenation, in which the carrier can be activated carbon or silicic acid. Reduction with hydrogen or with an alkaline hydrazine solution is indicated.

Schmitt, Jr., et al, in U.S. Pat. No. 4,035,260, disclose hydrogenation catalysts which comprise platinum metal on a preformed porous carbon support. Reduction of the metal is achieved with hydrogen.

U.S. Pat. No. 4,093,559 by Fernholz et al, discloses palladium catalysts used for the oxacylation of olefins. Among suitable carriers is active charcoal. Among cosolvents for the palladium compound being impregnated are ketones. The use of a ketone to treat a previously prepared catalyst is not suggested.

Although a variety of techniques have been disclosed for preparing palladium on carbon catalysts for hydrogenation and other chemical reactions, the present state of the art does not provide any palladium on carbon oxidation catalysts which effectively catalyze the production of hydrogen peroxide from its elements and also do not catalyze decomposition of thus-produced hydrogen peroxide to a commercially unacceptable extent.

SUMMARY OF THE INVENTION

This invention relates to improvements in a process for producing hydrogen peroxide by contacting a mixture of gases comprising hydrogen and oxygen with a palladium catalyst supported on a carbon base in the presence of an aqueous liquid capable of inhibiting decomposition of thus-produced hydrogen peroxide. One improvement comprises pretreating the catalyst with a ketone or aldehyde. The catalyst can also be pretreated with a dilute solution of hydrochloric acid as the sole treating agent or in addition to the treatment with the aldehyde or ketone.

In another aspect, this invention relates to the improvement of using high surface area non-graphitic carbon as support for a palladium catalyst, produced by deposition of a soluble palladium salt on the support, drying the impregnated support and reducing the palladium salt to palladium with hydrogen at temperatures from about 27° to about 200° C.

Advantages of this invention include:
(1) high selectivity favoring the synthesis of hydrogen peroxide over the competing decomposition reaction
(2) low dissolution losses for palladium
(3) increased catalyst life compared to that of presently available catalysts
(4) improved activity compared to commercially available palladium on carbon catalysts.

DETAILED DESCRIPTION

Figure 2:
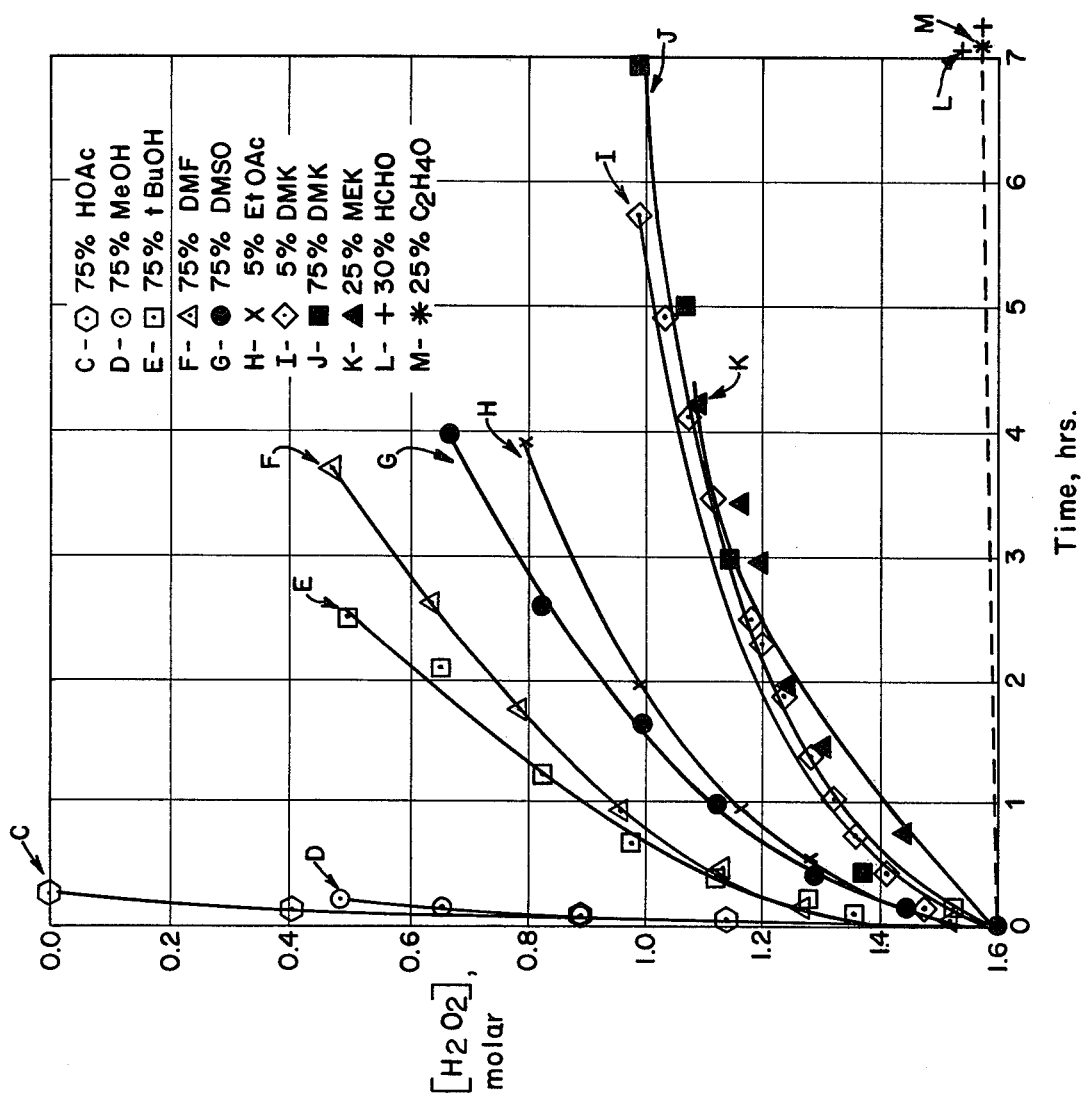
In FIG. 2 is shown the relationship between palladium-catalyzed decomposition of aqueous hydrogen peroxide and oxygenated co-solvent.

Comparative tests of palladium on silica gel alumina and carbon under conditions similar to those of the Hooper U.S. Pat. No. 3,336,112, supra, surprisingly indicated that loss of palladium by solubilization was markedly lower for palladium on carbon catalysts than for the other catalysts and that palladium on carbon catalyst gave the highest yields of hydrogen peroxide.

Of a variety of carbon supports available for use in accordance with the invention, those which are preferred are non-graphitic and have a high surface area and low catalytic activity in decomposing hydrogen peroxide. Among carbons experimentally found to have low catalytic activity in decomposing 5% hydrogen peroxide solution, determined by titration with potassium permanganate, are Darco KB, Darco G60, Darco G60 Special, Darco carbon black and Columbia 3LC-6/8. Carbon having a surface area above about 400 $m^2/g$ and decomposing less than about 25% of 5% aqueous hydrogen peroxide in 5 hours are preferred.

The palladium on carbon catalyst can be made by slurrying the carbon with a soluble palladium compound of which palladium (II) chloride in 0.1 N hydrochloric acid is exemplary. The impregnated carbon is filtered, dried and reduced. Catalysts obtained by reduction with hydrogen at from about 27° to 200° C., preferably 40°-140° C., gave the best yields of hydrogen peroxide. Reduction is judged to be complete when evolution of HCl, detected in the off gases by reaction with $AgNO_3$, ceases. It is convenient and preferred to stop the reduction within about an hour after this point is reached.

The term "palladium catalyst" used herein is intended to encompass a catalyst wherein the catalytic metal comprises palladium and includes specifically such bimetallic catalysts as palladium-gold, palladium-platinum, palladium-silver and palladium-rhenium.

Of the aqueous liquid media suggested as being capable of inhibiting the decomposition of hydrogen peroxide, those are preferred which contain an aldehyde or ketone and are at least 0.001 N with respect to hydrogen chloride or sulfuric acid, more preferably 0.01 N or more. Most preferably, the liquid medium contains both hydrochloric acid and sulfuric acid and the aldehyde or ketone is of up to four carbon atoms.

Use of an aldehyde or ketone as the sole pretreating agent considerably improves the stability of hydrogen peroxide toward decomposition, even when hydrogen peroxide decomposition is determined in a solvent lacking one or more of the inhibitors set forth above. Preferably, the catalyst is also pretreated with hydrochloric acid, either before treatment with the aldehyde or ketone or at the same time. Treatment with the aldehyde or ketone is done at −50° C. to 100° C., preferably −10° to 50° C., conveniently for 30 minutes to 24 hours.

The hydrochloric acid used to pretreat the catalyst is preferably at least 0.0001 N, more preferably 0.01 N. The treating medium can also contain sulfuric acid of at least 0.01 N.

The aqueous liquid in which hydrogen peroxide is prepared can also contain a sequestrative stabilizer for hydrogen peroxide, of which polymeric phosphates having a polymerization number of up to 14, as disclosed by Hooper U.S. Pat. No. 3,336,112, are exemplary.

DESCRIPTION OF PREFERRED EMBODIMENTS

Preferably, the process of this invention is as described above, wherein the aqueous liquid contains an aldehyde or ketone and is at least 0.0001 N with respect to sulfuric or hydrochloric acid. Most preferably, catalysts employed are made by deposition of palladium (II) chloride on non-graphitic carbon having a surface area greater than 400 $m^2/g$, drying the impregnated carbon and reducing with hydrogen at 40°-140° C., and pretreating the thus-obtained catalyst with an aldehyde or ketone and/or HCl.

Without further elaboration, it is believed that one skilled in the art can, using the preceding description, utilize the present invention to its fullest extent. The following specific embodiments are, therefore, to be construed as merely illustrative and not limitative of the remainder of the disclosure in any way whatsoever. In the following Examples, the temperatures are set forth uncorrected in degrees Celsius, unless otherwise indicated all parts and percentages are by weight.

EXAMPLE 1

Two grams of commercial 5% palladium on silica gel catalyst were charged to a stirred glass batch reactor containing 275 ml of 75% acetone-25% water by volume, which was 0.1 N in sulfuric acid and 0.01 N with respect to hydrochloric acid and which contained 100 ppm of each of sodium meta- and pyrophosphates. After the contents of the reactor were cooled to 0° C., hydrogen and oxygen were sparged through the stirred solvent/catalyst system at 0.6 scfh and 2.05 scfh, respectively, at a pressure of 125 psig. The temperature was kept at 0°-5° C. during the reaction. Samples of the reaction mixture were removed at intervals for determination of hydrogen peroxide concentration and solubilization of palladium. Hydrogen peroxide concentration was determined by titration with potassium permanganate and palladium solubilization by atomic absorption spectroscopy.

The following results were obtained:

| Elapsed Time, Hrs | Hydrogen peroxide Conc., M | Solubilized Palladium ug/cc | % of Charged Catalyst |
|---|---|---|---|
| 0.17 | 0.08 | 29.67 | 8.16 |
| 1.00 | 0.27 | 62.25 | 17.12 |
| 5.50 | 0.73 | 65.89 | 18.12 |

EXAMPLE 2

A commercially available 5% palladium alumina catalyst was used for an experiment, otherwise as in Example 1.

The following results were obtained:

| Elapsed Time, hrs. | Hydrogen Peroxide Conc., M | Solubilized Palladium | |
|---|---|---|---|
| | | μg/cc | % of Charged Catalyst |
| 1 | 0.672 | 45.89 | 12.62 |
| 3.5 | 0.896 | 42.42 | 11.24 |
| 4.6 | 0.901 | — | — |

EXAMPLE 3

Two grams of commercially available 5% palladium catalyst was evaluated in hydrogen peroxide synthesis as in Example 1, with the following results:

| Elapsed Time, hrs. | Hydrogen Peroxide Conc., M | Solubilized Palladium | |
|---|---|---|---|
| | | μg/cc | % of Charged Catalyst |
| 0.25 | 0.282 | 24.48 | 6.73 |
| 0.50 | 0.426 | 23.28 | 6.33 |
| 1.00 | 0.647 | 19.42 | 5.22 |
| 1.50 | 0.855 | 7.22 | 1.90 |
| 2.00 | 0.952 | 5.73 | 1.48 |
| 3.00 | 1.25 | 3.40 | 0.88 |
| 4.00 | 1.25 | 2.76 | 0.70 |

Examples 1–3 illustrate that palladium on carbon catalysts have higher catalytic activity than disclosed or predicted by the prior art and, unexpectedly, are subject to lower losses of palladium by solubilization than catalysts based on alumina or silica gel.

EXAMPLE 4

A. Selection of carbon black for catalysts

Decomposition of hydrogen peroxide (5% aqueous solution) at 27.7° C. by various carbon blacks was determined by titration with potassium permanganate. The amount of carbon was 2 g in 275 ml. of solution. Results for carbon blacks having varying physical properties are given in the Table:

indicated by disappearance of the characteristic color of Pd (II) chloride, the impregnated carbon was filtered and dried in vacuo at 100° C. The catalyst precursor was subjected to various reduction conditions and the efficiency of the reduced 3% palladium on carbon catalyst evaluated for hydrogen peroxide yield as in Example 1. The results were:

| Method of Reduction | | Reduction Temp., °C. | Hydrogen Peroxide Accumulation, % | | | |
|---|---|---|---|---|---|---|
| | | | 1 hr | 2 hr | 3 hr | 5 hr |
| A. | Formaldehyde (alkaline) | 80 | 1.51 | 1.86 | 1.86 | 1.86 |
| B. | $H_2$ | 27 | — | — | — | trace |
| C. | $H_2$ | 50 | 1.0 | 1.85 | 2.3 | 2.8 |
| D. | $H_2$ | 70 | 1.05 | 1.83 | 2.24 | 2.75 |
| E. | $H_2$ | 100 | 1.74 | 2.01 | 2.11 | 2.11 |
| F. | $H_2$ | 140 | 1.07 | 1.44 | 1.44 | 1.44 |
| G. | $H_2$ | 200 | 0.89 | 1.14 | 1.14 | 1.14 |
| H. | $H_2$ | 300 | 0.73 | 0.74 | 0.74 | 0.74 |
| I. | $H_2^{(a)}$ | 70 | 0.41 | 0.66 | 0.71 | 0.71 |
| J. | $H_2^{(b)}$ | 70 | 0.53 | 0.59 | 0.59 | 0.59 |

(a) Catalyst heat treated at 100° C. for 4 hours in nitrogen
(b) Catalyst heat treated at 200° for 5 hours in nitrogen Although each catalyst reduced in hydrogen above ambient temperature catalyzed the reaction to hydrogen peroxide, marked increases in hydrogen peroxide yield were achieved when palladium (II) chloride was reduced at 50°–200° C. Furthermore, reduction with hydrogen in this temperature range gave catalyst more active than obtained by the classical alkaline formaldehyde reduction. The experiments in which the catalysts were heated with nitrogen after reduction indicate that catalyst conditioning markedly affects hydrogen peroxide yield.

EXAMPLE 5

A. Effect of Acidity of Solvent on Palladium-Catalyzed Decomposition of Hydrogen Peroxide Decomposition at 27.7° C. of 5% (1.6 m) hydrogen

| Carbon(a) | Percent Ash, % Max. | % Acid Solubles | Surface Area m²/g | Total Pore Vol. cc/g | Pore Diameter Distribution | Acidic Sites meg/g | 5% aq $H_2O_2$ Decomp., % 27.7° C. | |
|---|---|---|---|---|---|---|---|---|
| | | | | | | | 2 hrs | 5 hrs |
| Nuchar #109(c) | — | — | — | — | — | 0.27 | 84.8 | 100 |
| BPL 4 × 8(d) | 8 | — | 1050–1150 | 0.70 | 43% 10-20A | 0.097 | 85.0 | 97.6 |
| RB Pulv | 23 | — | 1250–1400 | 1.22 | 16% 18-20A 41% 20-100A | 0.293 | 93.7 | 98.6 |
| DARCO-S51(e) | — | — | 672 | — | 78% 0-40A | 0.301 | 56.5 | 78.3 |
| DARCO KB | 3–6 | 2 | 1690 | — | 74% 0-40A 19% 40-100A | — | 8.3 | 14.0 |
| DARCO G60 | — | — | — | — | — | 0.845 | 15.3 | 22.9 |
| DARCO G60(f) Special | — | — | ~1100 | — | 0.427 cc/g between 20-1000A | 0.370 | 9.6 | 14.3 |
| DARCO Carbon Black | — | — | — | — | — | 0.30 | 10.2 | 22.9 |
| Columbia 3LC-6/8 | 2 | — | (b) | — | — | 0.268 | 9.4 | 15.8 |

(a) Physical properties are those given by supplier
(b) No data available, $CCl_4$ number indicates surface area 5-900
(c) Wood based carbon
(d) Bituminuous coal base
(e) lignite (or wood) base
(f) Special pure grade of G-60

B. Preparation and Evaluation of Catalysts

Figure 1:
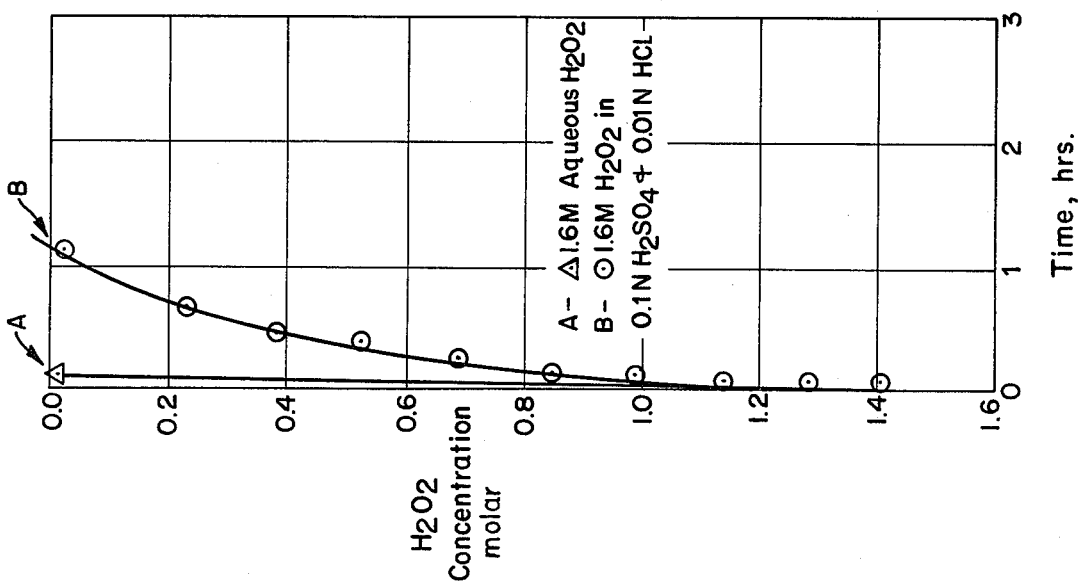
In FIG. 1 is the relationship between palladium-catalyzed decomposition of hydrogen peroxide and acidity of the aqueous solvent.

Catalyst precursor (palladium (II) chloride) was prepared by slurrying Darco G-60 Special carbon in 1.0 N aqueous hydrochloric acid containing palladium chloride (1 gm/100 cc). After adsorption was complete, peroxide solution in the presence of 0.25 g of 5% commercially available palladium on carbon catalyst per 25 ml of solution was followed as in Example 4. As shown in FIG. 1, decomposition of hydrogen peroxide solution is essentially within 5 minutes (line A, ▲) whereas decomposition is somewhat slower in 1.6 M hydrogen peroxide which is 0.1 N with respect to sulfuric acid and 0.01 N with respect to hydrochloric acid (line B, ⊙). Accordingly, it is apparent that the presence of hydrochloric acid and/or hydrochloric acid in the solvent medium slows, but does not stop, decomposition of hydrogen peroxide.

B. Effect of Oxygenated Co-Solvent of Palladium-Catalyzed Decomposition of Hydrogen Peroxide The decomposition of 1.6 M hydrogen peroxide in aqueous media, which contained the indicated amount by volume of an oxygenated organic solvent and which was 0.1 N with respect to sulfuric acid and 0.01 N with respect to hydrochloric acid, by 0.25 g of 5% commercially available palladium on carbon catalyst per 25 ml of solution was followed as in Example 4. Results are shown in FIG. 2. The most effective solvent systems for inhibiting the decomposition of hydrogen peroxide by palladium are therefore aldehydes and ketones, particularly 25% acetaldehyde—75% water (M, *), 30% formaldehyde—70% water (L, +), 25% methyl ethyl ketone—75% water (K, ▲), 75% acetone—25% water (J, ▨) and 5% acetone, 95% water (I, ◇).

EXAMPLE 6

Decomposition of hydrogen peroxide by 5% commercially available palladium on carbon at 27.7° C. was followed as in Example 4 in aqueous systems containing variously acetone, hydrochloric acid and/or sulfuric acid. Results were as follows:

| Run | Solvent System Vol. % Acetone | Water | N H$_2$SO$_4$ | HCl | Percent Peroxide Decomposition 5 min | 1 hr | 3 hr | 5 hr |
|---|---|---|---|---|---|---|---|---|
| A | 75 | 25 | 0.1 | 0.01 | — | 16 | 30 | 32 |
| B | — | 100 | — | — | 100 | — | — | — |
| C | 75 | 25 | — | — | 100 | — | — | — |
| D | — | 100 | 0.1 | 0.01 | 78$^{(a)}$ | 97 | — | — |
| E | 75 | 25 | 0.1 | — | — | 62 | 79 | 85 |
| F | 75 | 25 | — | 0.01 | — | 62 | — | — |

$^{(a)}$30 min.

These results indicate that optimal results are obtained in a system containing acetone and both hydrochloric acid and sulfuric acid. However, acetone and one of these acids in the aqueous solvent inhibits hydrogen peroxide decomposition to a lesser extent.

EXAMPLE 7

The effect of pretreating 5% commercially available palladium on carbon catalysts catalyzed decomposition of hydrogen peroxide was studied as in Example 4, using 0.25 g of catalyst in 25 ml of hydrogen peroxide at 27.7° C. The catalysts were pretreated with the indicated reagent for overnight at ambient temperature. Results were:

| Run | Pretreatment | Solvent | % Peroxide Decomposition 5 min | 1 hr | 3 hr | 5 hr |
|---|---|---|---|---|---|---|
| A | None | 75% acetone - 25% water, 0.1 N H$_2$SO$_4$, 0.01 N HCl | — | 16 | 30 | 32 |
| B | 75% acetone - 25% water, 0.1 N H$_2$SO$_4$, 0.01 N HCl | water | 73 | — | — | — |
| C | 0.01 N HCl followed by acetone | aqueous H$_2$SO$_4$ | — | 17 | 33 | — |
| D | 75% acetone - 25% water | aqueous 0.1 N H$_2$SO$_4$, 0.01 N HCl | — | 33 | — | — |
| E | aqueous 0.1 N H$_2$SO$_4$ | 75% acetone - 25% water | 100 | — | — | — |
| F | aqueous 0.01 N HCl | water | 87$^{(a)}$ | 94 | — | — |
| G | aqueous 0.01 N HCl | 75% acetone - 25% H$_2$O N H$_2$SO$_4$ | — | 25 | 42 | 54 |

$^{(a)}$30 min.

These results indicate that pretreatment of a palladium on carbon catalyst with an aldehyde or ketone, particularly with hydrochloric acid also, passivates the catalyst toward decomposition of hydrogen peroxide even in a medium containing only sulfuric acid as decomposition inhibitor. These results further show that pretreatment with hydrochloric acid alone is equally effective. It is postulated that sulfuric acid is required in the bulk medium to suppress the ionization of hydrogen peroxide to the peroxyanion, the intermediate by way of which peroxide rapidly decomposes.

$$HOOH \rightleftharpoons HOO^- + H^+$$

EXAMPLE 8

Two grams of commercial 5% palladium on carbon catalyst were pretreated by suspension overnight in 40 ml of 75% acetone—25% water by volume, which was 0.1 N in sulfuric acid and 0.01 N in hydrochloric acid. The catalyst was filtered and dried at atmospheric pressure and used for the synthesis of hydrogen peroxide as in Example 1. Comparative results for pretreated and untreated catalyst were:

| Elapsed Time, hrs. | Hydrogen Peroxide Conc., M | |
|---|---|---|
| | With Pretreatment | Without Pretreatment |
| 0.5 | 0.42 | 0.42 |
| 1 | 0.74 | 0.74 |
| 2 | 1.38 | 1.14 |
| 3 | 1.80 | 1.22 |
| 4 | 2.20 | 1.22 |
| 5 | 2.46 | 1.22 |

These results suggest that pretreatment affects both the rate of hydrogen peroxide decomposition and the yield of hydrogen peroxide.

What is claimed is:

1. In a process for producing hydrogen peroxide by contacting a mixture of hydrogen and oxygen with a previously-reduced palladium catalyst supported on a carbon base in the presence of an aqueous liquid, containing an acid and a non-acidic oxygen-containing organic compound, capable of inhibiting the decomposition of the thus-produced hydrogen peroxide, the improvement comprising pretreating the catalyst with a ketone or aldehyde before contacting the thus-pretreated catalyst with hydrogen and oxygen in the aqueous medium.

2. The process of claim 1, wherein the aqueous liquid contains an aldehyde or ketone and is at least 0.0001 N with respect to sulfuric of hydrochloric acid.

3. The process of claim 2, wherein the carbon base is non-graphitic and has a surface area greater than about 400 m$^2$/g and the palladium catalyst is deposited on the carbon base by impregnation with a solution of palladium (II) chloride, drying, and reduction at 40°–140° C. with hydrogen.

4. The process of claim 3, wherein the aqueous liquid contains a sequestrative stabilizer for hydrogen peroxide.

5. The process of claim 2, wherein the aqueous liquid contains a sequestrative stabilizer for hydrogen peroxide.

6. The process of claim 1, wherein the carbon base is non-graphitic and has a surface area greater than about 400 m$^2$/g.

7. The process of claim 1, wherein the catalyst is additionally pretreated with a dilute solution of HCl prior to or simultaneously with treatment with the aldehyde or ketone.

8. The process of claim 1, wherein the palladium catalyst is deposited on the carbon base by impregnation with a solution of palladium (II) chloride, drying, and reduction at 40°–140° C. with hydrogen for a time not substantially exceeding that required to reduce palladium (II) chloride to palladium.

9. The process of claim 1, wherein the catalyst is pretreated with an aqueous solution of an aldehyde which is at least 0.001 N with respect to hydrochloric acid.

10. In a process for producing hydrogen peroxide with a mixture of gases comprising hydrogen and oxygen with a palladium catalyst supported on a carbon base in the presence of an aqueous liquid, containing an acid and a non-acidic oxygen-containing organic compound, capable of inhibiting the decomposition of thus-produced hydrogen peroxide, the improvement wherein the carbon base is non-graphitic and has a surface area greater than 400 m$^2$/g and wherein the palladium catalyst is prepared by impregnating the carbon base with a soluble palladium compound, drying the thus-impregnated carbon base and reducing the palladium compound with which the carbon base is impregnated to palladium with hydrogen at 40°–140° C.

11. The process of claim 10, wherein the aqueous liquid contains an aldehydr or ketone and is at least 0.0001 N with respect to sulfuric or hydrochloric acid.

12. The process of claim 11, wherein the aqueous liquid contains a sequestrative stabilizer for hydrogen peroxide.

13. The process of claim 10, wherein the soluble palladium compound is palladium (II) chloride.

14. In a process for producing hydrogen peroxide by contacting a mixture of gases comprising hydrogen and oxygen with a previously-reduced palladium catalyst supported on a carbon base in the presence of an aqueous liquid, containing an acid and a non-acidic oxygen-containing organic compound, capable of inhibiting the decomposition of the thus-produced hydrogen peroxide, the improvement comprising pretreating the catalyst with a dilute solution of HCl before contacting the thus-pretreated catalyst with hydrogen and oxygen in the aqueous medium.

15. The process of claim 14, wherein the carbon base is non-graphitic and has a surface area greater than about 400 m$^2$/g.

* * * * *